(12) United States Patent
Xie

(10) Patent No.: US 6,758,236 B2
(45) Date of Patent: Jul. 6, 2004

(54) SELF-ACTING VALVE

(76) Inventor: Senyuan Xie, Huangbianshi No 2 Mineral Plant, Xinshi, Guangzhou (CN)

(*) Notice: Subject to any disclaimer, the term of this patent is extended or adjusted under 35 U.S.C. 154(b) by 127 days.

(21) Appl. No.: 10/184,201

(22) Filed: Jun. 26, 2002

(65) Prior Publication Data
US 2003/0131890 A1 Jul. 17, 2003

(30) Foreign Application Priority Data
Jan. 15, 2002 (CN) .................................. 02225148 U

(51) Int. Cl.⁷ .......................... F16K 15/20; F16K 15/14
(52) U.S. Cl. ................... 137/223; 137/512.15; 137/859; 446/224
(58) Field of Search .................. 137/223, 512.15, 137/859; 446/224

(56) References Cited

U.S. PATENT DOCUMENTS

| 679,519 | A | | 7/1901 | Smith | |
|---|---|---|---|---|---|
| 1,621,498 | A | * | 3/1927 | Drager | 137/852 |
| 1,910,961 | A | * | 5/1933 | Perry | 137/223 |
| 2,162,603 | A | * | 6/1939 | Otto | 137/859 |
| 2,376,712 | A | * | 5/1945 | Moran | 137/859 |
| 2,586,455 | A | * | 2/1952 | Coskey | 137/223 |
| 2,604,297 | A | * | 7/1952 | Winstead | 137/223 |
| 2,942,614 | A | * | 6/1960 | Lardner | 137/223 |
| 2,981,276 | A | * | 4/1961 | Peras | 137/223 |
| 3,659,625 | A | | 5/1972 | Coiner et al. | |
| 3,785,395 | A | | 1/1974 | Andreasson | |
| 4,579,141 | A | | 4/1986 | Arff | |
| 5,941,272 | A | | 8/1999 | Feldman | |
| 6,357,468 | B1 | * | 3/2002 | Roussel | 137/223 |
| 6,374,855 | B1 | | 4/2002 | Hansen | |

FOREIGN PATENT DOCUMENTS

GB 950618 * 2/1964 ................ 137/859

* cited by examiner

Primary Examiner—John Rivell
(74) Attorney, Agent, or Firm—Intellectual Property Law Group LLP; Otto O. Lee; Juneko Jackson

(57) ABSTRACT

The present invention is a self-acting valve, and it may specifically be used for air mattresses. This self-acting valve consists of a housing, a membrane and a base. After a quick inflation, the elastic airtight membrane positioned within the housing reverts to its original shape and instantly shuts off the outlets, which prevents air from leaking out. This valve is able to operate automatically to form a perfect airtight seal. The structure of this valve is simple, reliable, and practical, which makes it a new type of self-acting valve for an air mattress.

8 Claims, 1 Drawing Sheet

SELF-ACTING VALVE

BACKGROUND OF THE INVENTION

1. Field of the Invention

The present invention is a new type of valve for inflatable products that is particularly suited for the type of air cushions and mattresses that are used daily in a home.

2. Description of the Prior Act

Air mattresses and cushions are currently very popular because they may be beautifully designed, they use a minimum of materials, and they are inexpensive and easily carried. Usually, an ordinary valve is installed on an air cushion to both inflate and deflate it. The ordinary valve consists of a tube that is sealed by inserting a plug into its air passage. The plug is held in place with a cap. This valve often leaks, however, in part because air pressure inside a cushion is higher than air pressure outside the cushion. Air cushions with this type of valve often need to be reinflated, and they also usually require that a second valve be installed.

SUMMARY OF THE INVENTION

The purpose of the embodiments of the present invention is to overcome the limitations of leaking valves and problems of having to frequently reinflate air cushions by providing for a new type of highly airtight, self-acting valve.

In an embodiment of the present invention, the valve opens or closes automatically, which makes it suitable for quick inflation. In another embodiment, the valve also does not require an exterior plug to be inserted and held with a cap. In other embodiments, the valve also meets the demands for an automatic, swift, and airtight valve for inflatable products, examples of which include cushions, mattresses and inflatable toys.

In one embodiment of the present invention, the self-acting valve consists of a housing, a membrane positioned within the housing, and a base. The housing is at the top of the assembly, the membrane is in the middle, and the base is at the bottom. The membrane is held in place by the base and the flange of the housing. There are multiple outlets on the surface of the housing. The valve is positioned on a wall of an air cushion or other inflatable product. In order to inflate an air cushion through the valve, the inlet of the valve is connected to an air pump. When air pressure at the inlet of the valve is high enough, air pressure forces the membrane down, which allows air to flow from the inlets to the outlets. When inflation is completed, air pressure inside the mattress helps the elastic membrane revert to its original shape and seal the inlets and outlets of the valve. This makes the valve airtight, which makes it able to seal air inside an air cushion without any leakage.

These and other embodiments of the present invention are further made apparent, in the remainder of the present document, to those of ordinary skill in the art.

BRIEF DESCRIPTION OF THE DRAWINGS

Features, aspects and advantages of some embodiments of the present invention will become better understood with reference to the accompanying drawings, which are not to be considered limitations in the scope of the invention, but are merely illustrative.

DETAILED DESCRIPTION OF SPECIFIC EMBODIMENTS

The description above and below and the drawings of the present document discuss one or more currently preferred embodiment(s) and also describe some exemplary optional feature(s) and alternative embodiment(s). The description and drawings are for the purpose of illustration and not limitation. Section titles are terse and are for convenience and not limitation.

Figure 1:
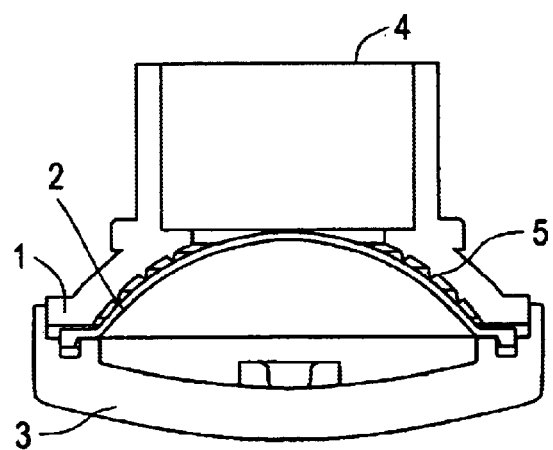
FIG. 1 is the side view of the cross-section of a self-acting valve of the preferred embodiment.

According to FIG. 1, an embodiment of the present invention of a self-acting valve comprises a housing (1), a membrane (2), a base (3), an inlet (4) and a plurality of outlets (5). As illustrated in FIG. 1, a self-acting valve comprises a housing (1) with outlets (5) on the surface, a membrane (2) positioned within the housing (1), and a base (3) attached to one end of the housing (1). The membrane (2) is fastened by the base (3) and the flange of the housing (1). One surface of the membrane (2), which faces the inlet (4), tightly covers the inlet (4) and outlets (5). While a cushion is being inflated, high pressure air at the inlet (4) presses the membrane (2) down, which uncovers the inlet (4) and the outlets (5) and allows air to flow between them and into the air cushion. When inflation stops, air pressure at the inlet (4) drops and allows the membrane (2) to revert to its original shape. When the membrane (2) returns to its original shape, air pressure inside the cushion helps the membrane (2) to cover the outlets (5), which instantly shuts off any airflow through them. Thus, after inflation, the air within the cushion is sealed inside without any leakage.

Figure 2:
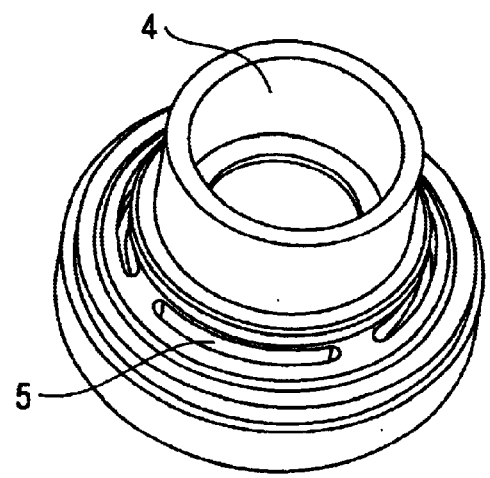
FIG. 2 is a perspective view of the preferred embodiment of the present invention.

According to another view of an embodiment of the present invention shown in FIG. 2, there are a plurality of outlets (5) and an inlet (4) on the housing (1). While a cushion is being inflated, the inlet (4) and the outlets (5) are uncovered, which allows air to go into a cushion. When inflation is completed, the connection between the inlet (4) and the outlets (5) is shut off instantly, which prevents air from exiting an air cushion.

Figure 3:
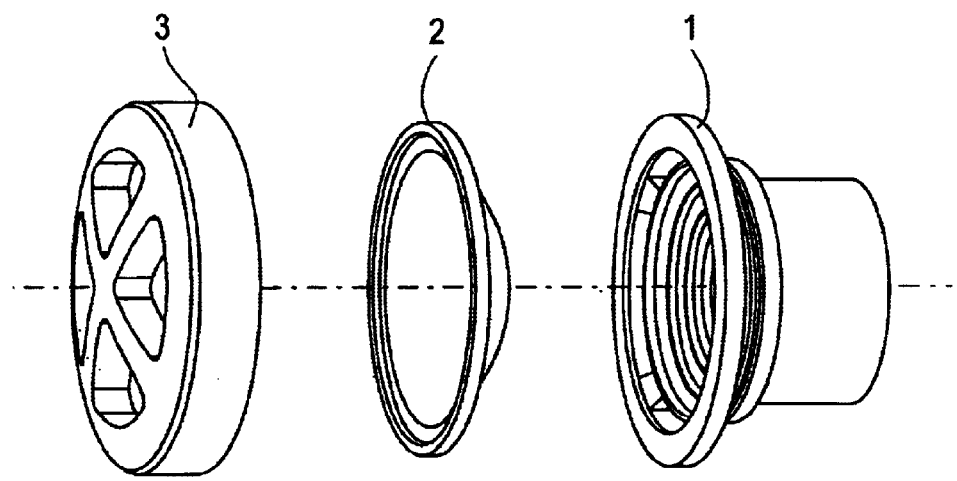
FIG. 3 is an exploded view of the preferred embodiment of the present invention.

According to another dissected view of an embodiment of the present invention shown in FIG. 3, the membrane (2) is positioned within the housing (1) and fastened by the base (3) for the valve and the flange of the housing (1). Thus, the membrane (2) is fastened between the base (3) and the housing (1). The housing (1) and the base (3) are essentially made of plastic and the membrane (2) is essentially made of rubber, but a variety of materials may be substituted for rubber and plastic.

The embodiment of the present invention can be employed not only on an air cushion but with an air sofa, air chair, raft or sport cushion as well. This valve operates automatically with the ability to form perfect airtight seals. The structure of this valve is simple, reliable and practical, which makes it a new type of self-acting valve for air cushions.

The scope of the invention is not limited merely to the specific example embodiments or configurations of the foregoing description, but rather is indicated by the appended claims. It will be appreciated by those of ordinary skill in the art that the present invention can be embodied in other specific forms without deporting from the spirit and scope of the present invention. All changes that come within the meaning and range of equivalents within the claims are intended to be understood as being embraced within the scope of the claims.

What is claimed is:

1. A self-acting valve for inflating products comprising:

a housing comprising a top, a bottom, an inlet, and one or more outlets;

a base comprising a top surface, a bottom surface, and one or more holes, with said top surface being attachable to said bottom surface of said housing leaving an opening between said housing and said base;

an elastic airtight membrane that is held in between said bottom and said top surface of said base, wherein said membrane is capable of flexing to cover or uncover said inlet and outlets in said housing to control the flow of air or fluid between said inlet and said outlets.

2. A self-acting valve as described in claim 1, wherein said housing and said base are made of plastic, and said membrane is made of rubber.

3. A self-acting valve according to claim 1, wherein the base is further removably attached to said housing.

4. A self-acting valve according to claim 1, wherein the inlet further comprises an inside end, where upon attaching the self-acting valve to an inflatable product and pumping air into the inlet, the membrane deflects to allow air to flow into the inflatable product, where upon removal of a pump from the inlet, if air pressure inside the inflatable product is sufficiently higher than air pressure outside the inflatable product, internal air pressure moves and holds the membrane against the inlet and outlets, whereby the membrane forms an airtight seal against the inside end of said inlet and against the plurality of outlets to prevent air from escaping.

5. A self-acting valve for inflating products comprising:

a housing comprising a top, a bottom, a flange, an inlet, and a plurality of outlets, with said inlet and outlets forming passages with openings in said bottom and said top;

a base comprising a top surface, a bottom surface, and one or more holes, with said top surface being attachable to said bottom surface of said housing leaving an opening between said housing and said base;

an elastic airtight membrane that is held in between said flange and said top surface of said base, wherein said membrane is capable of flexing to cover or uncover said inlet and outlets in said housing to control the flow of air or fluid between said inlet and said outlets.

6. A self-acting valve according to claim 5, wherein the base is further removably attached to said housing.

7. A self-acting valve as described in claim 5, wherein said housing and said base are made of plastic, and said membrane is made of rubber.

8. A self-acting valve according to claim 5, wherein the inlet further comprises an inside end, where upon attaching the self-acting valve to an inflatable product and pumping air into the inlet, the membrane deflects to allow air to flow into the inflatable product, where upon removal of a pump from the inlet, if air pressure inside the inflatable product is sufficiently higher than air pressure outside the inflatable product, internal air pressure moves and holds the membrane against the inlet and outlets, whereby the membrane forms an airtight seal against the inside end of said inlet and against the plurality of outlets to prevent air from escaping.

* * * * *